(12) United States Patent
Wang et al.

(10) Patent No.: US 11,475,671 B2
(45) Date of Patent: Oct. 18, 2022

(54) MULTIPLE ROBOTS ASSISTED SURVEILLANCE SYSTEM

(71) Applicant: TURING VIDEO, San Mateo, CA (US)

(72) Inventors: Fang Wang, Redwood City, CA (US); Song Cao, San Mateo, CA (US)

(73) Assignee: Turing Video, San Mateo, CA (US)

( * ) Notice: Subject to any disclaimer, the term of this patent is extended or adjusted under 35 U.S.C. 154(b) by 0 days.

(21) Appl. No.: 15/971,456

(22) Filed: May 4, 2018

(65) Prior Publication Data

US 2018/0341814 A1 Nov. 29, 2018

Related U.S. Application Data

(60) Provisional application No. 62/511,952, filed on May 26, 2017.

(51) Int. Cl.
*G06K 9/00* (2022.01)
*G08B 13/196* (2006.01)
(Continued)

(52) U.S. Cl.
CPC .............. *G06V 20/52* (2022.01); *G06V 20/10* (2022.01); *G08B 13/19608* (2013.01);
(Continued)

(58) Field of Classification Search
CPC ............... G06F 19/3418; G06F 19/324; G06F 19/3456; G06F 16/9535; G06F 3/0482; G06F 16/248; G06F 16/951; G06F 16/9566; G06F 16/9577; G06F 16/958; G06F 16/972; G06F 17/248; G06F 21/35; A61B 5/165; A61B 5/0077; A61B 5/18; A61B 5/01; A61B 5/02405; A61B 5/1176; A61B 18/1402; A61B 18/1815; A61B 2018/00589; A61B 2018/00642; A61B 2018/00708; A61B 2018/00821;
(Continued)

(56) References Cited

U.S. PATENT DOCUMENTS 5,666,157 A 9/1997 Aviv
6,028,626 A 2/2000 Aviv
(Continued)

OTHER PUBLICATIONS

U.S. Appl. No. 62/469,534, filed Mar. 10, 2017.
(Continued)

*Primary Examiner* — Mikhail Itskovich
(74) *Attorney, Agent, or Firm* — Sheppard Mullin Richter & Hampton LLP (57) ABSTRACT

A surveillance system may comprise one or more computing devices and a plurality of robotic surveillance devices. The one or more computing devices may be configured to obtain video data captured by one or more cameras. The one or more computing devices may analyze the video data to identify two or more conditions, and associate results of the identification with respect to the two or more conditions to determine an activity category. The one or more computing device may assign tasks to the plurality of robotic surveillance devices based on the determined activity category. The plurality of robotic surveillance devices may be configured to perform responding actions in response to receiving the tasks.

14 Claims, 8 Drawing Sheets

(51) Int. Cl.
  *H04N 7/18* (2006.01)
  *G06V 20/52* (2022.01)
  *G06V 20/10* (2022.01)
(52) U.S. Cl.
  CPC . *G08B 13/19613* (2013.01); *G08B 13/19663* (2013.01); *H04N 7/181* (2013.01)
(58) Field of Classification Search
  CPC ... A61B 5/02055; A61B 18/14; A61B 18/148; A61B 18/1482; B25J 9/1682; B25J 9/16; B25J 9/161; B25J 9/1666; B25J 9/1697; B25J 9/1669; B25J 9/1674; B25J 9/1689; B25J 11/008; B25J 13/006; B25J 15/0433; B25J 15/0466; B25J 15/0483; B25J 9/0084; B25J 9/163
  See application file for complete search history.

(56) References Cited

U.S. PATENT DOCUMENTS

| | | | |
|---|---|---|---|
| 7,227,893 B1 | 6/2007 | Srinivasa et al. | |
| 7,299,152 B1* | 11/2007 | Moritz | G08B 19/00 340/573.1 |
| 8,004,563 B2 | 8/2011 | Talmon et al. | |
| 9,044,543 B2 | 6/2015 | Levien et al. | |
| 9,412,278 B1 | 8/2016 | Gong et al. | |
| 9,494,936 B2* | 11/2016 | Kerzner | G05D 1/0022 |
| 9,537,954 B2 | 1/2017 | Ranasinghe et al. | |
| 9,564,031 B2 | 2/2017 | Migdal et al. | |
| 9,582,895 B2 | 2/2017 | Brown et al. | |
| 9,609,288 B1 | 3/2017 | Richman et al. | |
| 9,672,707 B2* | 6/2017 | Kerzner | H04N 5/04 |
| 9,697,425 B2 | 7/2017 | Saptharishi et al. | |
| 9,798,325 B2 | 10/2017 | Levien et al. | |
| 9,910,436 B1 | 3/2018 | Li et al. | |
| 10,019,000 B2 | 7/2018 | Levien et al. | |
| 10,019,633 B2 | 7/2018 | Chen et al. | |
| 10,088,841 B2* | 10/2018 | Kerzner | G05D 1/0022 |
| 10,360,744 B1* | 7/2019 | Kerzner | H04N 7/185 |
| 10,372,970 B2* | 8/2019 | Wang | G06T 7/70 |
| 2004/0061781 A1* | 4/2004 | Fennell | G08B 13/19602 348/169 |
| 2006/0120609 A1* | 6/2006 | Ivanov | G06K 9/00711 382/224 |
| 2007/0058040 A1* | 3/2007 | Zhang | G06K 9/00771 348/150 |
| 2008/0081958 A1 | 4/2008 | Denison et al. | |
| 2008/0226129 A1* | 9/2008 | Kundu | A47F 9/045 382/103 |
| 2009/0181640 A1 | 7/2009 | Jones | |
| 2010/0079675 A1 | 4/2010 | Oya | |
| 2010/0106573 A1 | 4/2010 | Gallagher et al. | |
| 2010/0150403 A1* | 6/2010 | Cavallaro | G06K 9/00778 382/107 |
| 2011/0231016 A1* | 9/2011 | Goulding | G01C 21/20 700/246 |
| 2012/0127316 A1* | 5/2012 | Kundu | G06K 9/00771 348/150 |
| 2012/0188377 A1* | 7/2012 | Kundu | A47F 9/045 348/150 |
| 2012/0230629 A1* | 9/2012 | Hill | G01D 5/35348 385/12 |
| 2014/0079297 A1 | 3/2014 | Tadayon et al. | |
| 2014/0118543 A1 | 5/2014 | Kerbs et al. | |
| 2014/0201126 A1 | 7/2014 | Zadeh et al. | |
| 2014/0279516 A1 | 9/2014 | Rellas et al. | |
| 2015/0278585 A1 | 10/2015 | Laksono et al. | |
| 2016/0049071 A1 | 2/2016 | Beaver et al. | |
| 2016/0232777 A1* | 8/2016 | Jedwab | G08B 13/19602 |
| 2016/0266577 A1 | 9/2016 | Kerzner | |
| 2016/0267759 A1* | 9/2016 | Kerzner | G06T 19/006 |
| 2016/0278667 A1 | 9/2016 | Villard et al. | |
| 2016/0335865 A1 | 11/2016 | Sayavong et al. | |
| 2016/0364927 A1 | 12/2016 | Barry et al. | |
| 2017/0052539 A1* | 2/2017 | Kerzner | G05D 1/0022 |
| 2017/0098161 A1* | 4/2017 | Ellenbogen | H04L 43/04 |
| 2017/0098162 A1* | 4/2017 | Ellenbogen | H04L 43/04 |
| 2017/0098172 A1* | 4/2017 | Ellenbogen | H04L 43/04 |
| 2017/0099200 A1* | 4/2017 | Ellenbogen | H04L 43/04 |
| 2018/0075593 A1* | 3/2018 | Wang | G06K 9/00281 |
| 2018/0137456 A1 | 5/2018 | Fan et al. | |
| 2018/0295327 A1* | 10/2018 | Yearwood | B64C 39/024 |
| 2018/0350218 A1* | 12/2018 | Jeon | G08B 13/2462 |
| 2019/0011909 A1* | 1/2019 | Kerzner | G05D 1/0022 |

OTHER PUBLICATIONS

U.S. Appl. No. 15/914,360, filed Mar. 7, 2018.
Wang, Xinyu et al., "Robust and Real-Time Deep Tracking via Multi-Scale Domain Adaptation," arXiv:1701.00561v1 [cs.CV], Jan. 3, 2017.
Non-Final Office Action dated Sep. 10, 2019, issued in related U.S. Appl. No. 15/971,437, 30 pages.
Non-Final Office Action dated Sep. 23, 2020, issued in related U.S. Appl. No. 16/889,737 (49 pages).
Notice of Allowance dated Feb. 18, 2020, issued in related U.S. Appl. No. 15/914,360 (11 pages).

* cited by examiner

MULTIPLE ROBOTS ASSISTED SURVEILLANCE SYSTEM

CROSS REFERENCE TO RELATED APPLICATION

This application claims the benefit of priority to U.S. Provisional Application No. 62/511,952, filed with the United States Patent and Trademark Office on May 26, 2017, and entitled "MULTIPLE ROBOTS ASSISTED SURVEILLANCE SYSTEM," which is hereby incorporated by reference in its entirety.

TECHNICAL FIELD

The present invention relates to a surveillance system, and in particular, to a surveillance system assisted by a plurality of mobile robotic surveillance devices.

BACKGROUND

Surveillance systems, more specifically video surveillance systems, have been widely used in a variety of industries. However, increasing demands on accuracy and timeliness exposes several problems of existing surveillance systems. For example, existing surveillance systems are not flexible. Once installed, they cannot move. Some surveillance systems may have pan-tilt-zoom functions, but the positions of cameras are fixed. Even carefully designed, such systems may still have dead angles. This problem is getting worse where surrounding environment changes, while the surveillance systems cannot change accordingly. In addition to the problem of dead angle or the like, fixed cameras may have accuracy problem. For example, in face recognition, the algorithm usually has a maximum size and a minimum size limitation on a person in an image. However, when the person is approaching from a distance, which occurs frequently in real life, the size difference of the person in the image may be significant, exceeding the limitations of the face recognition algorithm and thus decreasing the accuracy in face recognition.

Some existing surveillance systems may use robots to facilitate surveillance. However, these robots usually work independently, capturing video footage, detecting dangerous situations, and transmitting information about the detected dangerous situations back to a remote central monitoring station. A few types of mobile security robots have been developed and commercialized that allow cooperation between the mobile security robots and security officers. Drones may also be used for capturing video and transmitting information back to the central monitoring station. However, these surveillance systems usually lack cooperation between robots and fixed surveillance devices as well as cooperation among the robots.

Lately, there have been studies regarding cooperation among a plurality of robots. For example, research has shown that a plurality of drones may cooperate to accomplish one task together. The key of such cooperation lies in the planning of a specific task. For example, fully autonomous humanoid robots may act as soccer players and cooperate with one another to play a soccer game. Such game involves real-time planning, real-time sensor fusion, reactive behavior, strategy acquisition, learning, intelligent robot control, etc. However, cooperation among robots has not been applied to video surveillance domain.

SUMMARY

According to one aspect of the present disclosure, a surveillance system may comprise: one or more computing devices and a plurality of robotic surveillance devices. The one or more computing devices may be configured to: obtain video data captured by one or more cameras; analyze the video data to identify two or more conditions; associate results of the identification with respect to the two or more conditions to determine an activity category; and assign tasks to the plurality of robotic surveillance devices based on the determined activity category. The plurality of robotic surveillance devices may be configured to perform responding actions in response to receiving the tasks.

In some embodiments, the two or more conditions may include two or more of the following: a person identity, an activity, a combination of a person identity and an activity, or a non-human object. In some embodiments, the activity category may include a non-suspicious activity category, a possible suspicious activity category, an on-going suspicious activity category, and a post-activity category. In some embodiments, the non-suspicious activity category may be determined when no suspicious person and no suspicious activity may be identified. The possible suspicious activity category may be determined when a suspicious person is detected, but no suspicious activity is identified. The on-going suspicious activity category may be determined when a suspicious person and an on-going suspicious activity are identified. The post-activity category may be determined when it is identified that a suspicious activity has been conducted and a suspicious person is escaping.

In some embodiments, assigning tasks to the plurality of robotic surveillance devices based on the determined activity category may comprise: determining a zone where one of the conditions occurs; determining relative locations of the plurality of robotic surveillance devices to the zone of the condition; classifying the plurality of robotic surveillance devices into different groups based on their relative locations to the zone of the condition; and assigning different tasks to the plurality of robotic surveillance devices based on their groups.

In some embodiments, when the activity category is a possible suspicious activity category, assigning tasks to the plurality of robotic surveillance devices may comprise assigning a task of approaching and tracking a suspicious person to one or more robotic surveillance devices within the zone of the condition. In some embodiments, when the activity category is a post-activity category, assigning tasks to the plurality of robotic surveillance devices may comprise assigning a task of performing video recording and tracking a suspicious person to one or more robotic surveillance devices within the zone of the condition.

In some embodiments, the one or more computing devices may be further configured to: determining an adjacent zone that is adjacent to the zone of the condition; determining a non-adjacent zone that is not adjacent to the zone of the condition; and classifying the plurality of robotic surveillance devices into the different groups based on their relative locations to the zone of the condition, the adjacent zone and the non-adjacent zone. In some embodiments, when the activity category is a possible suspicious activity category, assigning tasks to the plurality of robotic surveillance devices may comprise assigning one or more robotic surveillance devices in the adjacent zone with a task of approaching to the zone of condition and monitoring the current zone. In some embodiments, where the activity category is a possible suspicious activity category, assigning tasks to the plurality of robotic surveillance devices may comprise assigning a task of patrolling in the current zone to one or more robotic surveillance devices in the non-adjacent zone.

According to another aspect of the present disclosure, a surveillance method may comprise: obtaining video data; analyzing the video data to identify two or more conditions; associating results of the identification with respect to the two or more conditions to determine an activity category; and assigning tasks to the plurality of robotic surveillance devices based on the determined activity category.

According to yet another aspect of the present disclosure, a robotic device for surveillance may comprise: one or more processors; and a memory storing instructions. The instructions, when executed by the one or more processors, may cause the robotic device to perform: obtaining video data captured by one or more cameras; analyzing the video data to identify two or more conditions; associating results of the identification with respect to the two or more conditions to determine an activity category; assigning tasks to a plurality of robotic devices based on the determined activity category; and in response to receiving an assigned task, performing a responding action.

It is to be understood that both the foregoing general description and the following detailed description are exemplary and explanatory only, and are not restrictive of the invention.

BRIEF DESCRIPTION OF THE DRAWINGS

In order to illustrate the solutions of embodiments of the present disclosure more clearly, drawings used in connection with the embodiments will be briefly described below. It should be understood that the following drawings illustrate only certain embodiments of the present disclosure, and the scope of the present disclosure is not limited thereto.

DETAILED DESCRIPTION OF THE DRAWINGS

The present disclosure will now be described in further detail hereinafter with reference to the accompanying drawings, in which various exemplary embodiments are shown. This present disclosure may, however, be embodied in many different forms and should not be construed as limited to the embodiments set forth herein; rather, these embodiments are provided so that this disclosure will be thorough and complete, and will fully convey the scope of the invention to those skilled in the art.

As mentioned above, the present disclosure aims at developing a surveillance system with robotic surveillance devices that may collaborate with each other to accomplish a mission together. The present disclosure focuses on behaviors of robotic surveillance devices under different scenarios, rather than limited to a specific type of communication. Therefore, the main purpose of the robots assisted surveillance system is defining different scenarios and assigning tasks to each robotic surveillance device according to the corresponding scenarios. The defined scenario may also be referred to as an "activity category."

Figure 1:
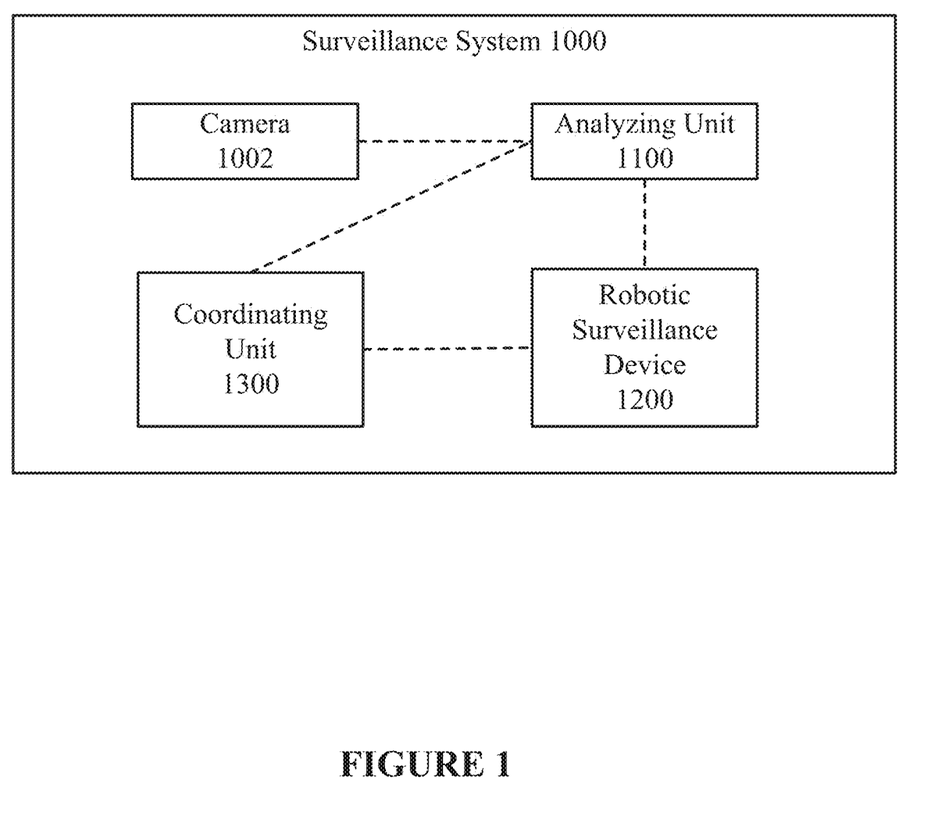
FIG. 1 illustrates an exemplary robot assisted surveillance system according to some embodiments of the present disclosure.

FIG. 1 illustrates an exemplary robot assisted surveillance system 1000 according to some embodiments of the present disclosure. In these embodiments, the surveillance system 1000 may be used for recognizing a specific person and/or identifying a person's specific behavior and for performing a responding action to the recognition of the person and to the identification of the behavior accordingly with the help of a plurality of robotic surveillance devices. As shown in FIG. 1, the surveillance system 1000 may include one or more cameras 1002, an analyzing unit 1100, a plurality of robotic surveillance devices 1200 (also referred to as a robot 1200 or a robot device 1200), and a coordinating unit 1300. These components of the surveillance system 1000 may be communicative with one another and other devices via Wi-Fi, cable, or another communication channel.

The one or more cameras 1002 may be used for capturing video data. For example, the one or more cameras 1002 may capture and record human activities into video data. The one or more cameras 1002 may transmit the video data to one or more of the other components of the surveillance system 1000 via a communication channel. In some embodiments, the one or more cameras 1002 may be separate units of the surveillance system 1000. For example, the one or more cameras 1002 may be positioned at predetermined fixed locations. Alternatively, the one or more cameras 1002 may be embedded in one or more of the robotic surveillance devices 1200, e.g., a drone or a motorized device. In yet other embodiments, the surveillance system 1000 may equip with multiple cameras distributed all over an area, while some of which are fixed at predetermined locations, others of which are embedded on one or more of the robotic surveillance devices 1200 to provide a thorough coverage of the area.

Figure 2:
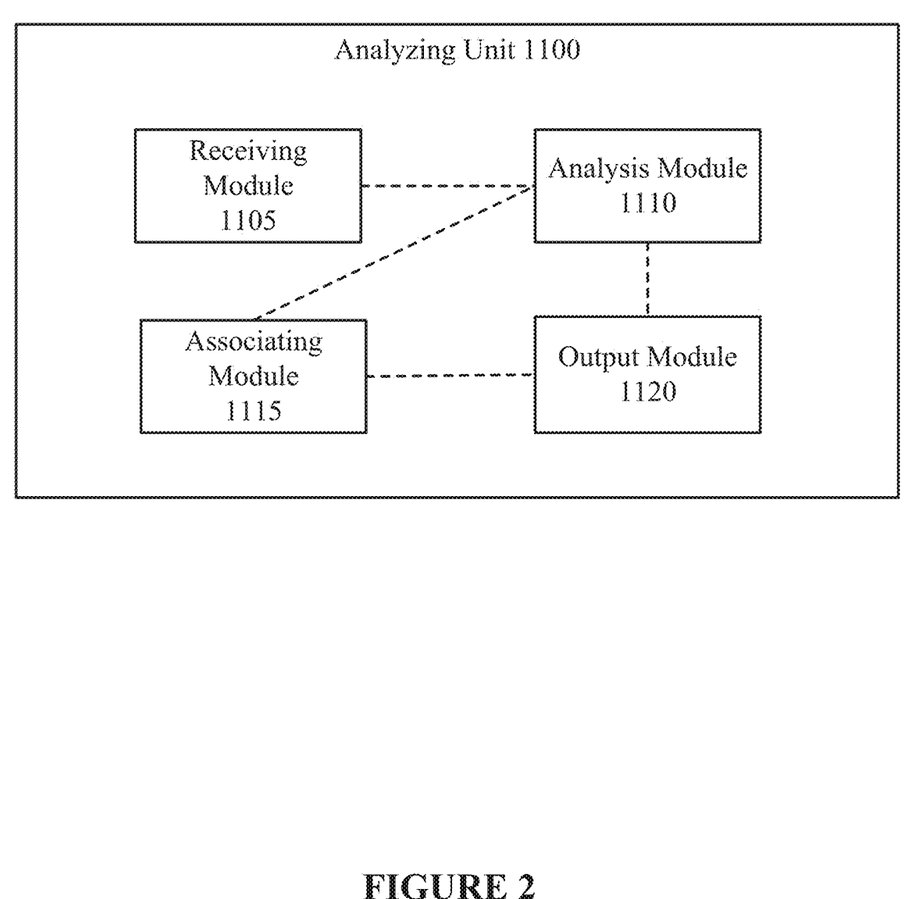
FIG. 2 illustrates components of an exemplary analyzing unit according to some embodiments of the present disclosure.

The analyzing unit 1100 may be configured to analyze the video data captured by the one or more cameras 1002 and to detect a trigger event. The analyzing unit 1100 may be a separate unit of the surveillance system 1000. For example, the analyzing unit 1100 may be, or may reside on a computing device such as a smart phone, a person computer, a laptop, a tablet, a smart wearable device, etc. Alternatively, the analyzing unit 1100 may be embedded in one or more of the robotic surveillance devices 1200. Referring to FIG. 2, illustrated are components of an exemplary analyzing unit 1100 according to some embodiments of the present disclosure. As shown in FIG. 2, the analyzing unit 1100 may include a receiving module 1105, an analysis module 1110, an associating module 1115, and an output module 1120. The receiving module 1105 may be configured to receive input video data from the one or more cameras 1002.

The analysis module 1110 may be configured to analyze input video data to identify two or more conditions such as a person and a behavior of the person. In some embodiments, a condition may be a specific person's appearing in the video, a person's specific behavior's occurring, or a showing of a non-human object such as an animal, an automobile, a package, a box, etc. For example, a condition may be identified when the analysis module 1110 detects, in the video data, a specific person, such as a suspect in the wanted list of the policy. In another example, the analysis module 1110 may identify it is a condition that some person is sneaking around a room with a label saying "No entry." In yet another example, the analysis module 1110 may identify a condition where there is a car without a plate.

In some embodiments, the analysis module 1110 may utilize a face recognition algorithm to identify a person's identity. For example, the analyzing unit 1100 may utilize a face recognition algorithm that adopts the Viola-Jones framework. Other face recognition algorithms may also be suitable, and are not limited by embodiments of the present disclosure.

In some embodiments, the analysis module 1110 may use an activity recognition algorithm to recognize a person's behavior. For example, the analysis module 1110 may use an activity recognition algorithm that adopts a tree structure model such as the Hierarchy Pose Temporal Model (HPT) disclosed by U.S. Provisional Application No. 62/469,534 and also disclosed by U.S. patent application Ser. No. 15/914,360, filed with the United States Patent and Trademark Office on Mar. 7, 2018, and entitled "ACTIVITY RECOGNITION METHOD AND SYSTEM." Specifically, the HPT algorithm may adopt a deep learning method and combine three levels of information including scene information, temporal information and human pose information to achieve better activity recognition. For example, scene information may include statistical scene features, which can be extracted based on the deep learning method. The temporal information may include temporal features obtained from certain extracted key frames of video data. The human pose information may include pose features which may be extracted from certain frames of video data. The obtained features may be combined to achieve a final result. Other activity recognition algorithms may also be suitable, and are not limited by embodiments of the present disclosure.

Based on the face recognition and activity recognition techniques, the detection of identities (or faces), and/or activities may form a condition. The analysis module 1110 may use other detection algorithms, e.g., object detection algorithm, to detect a situation other than person identities and activities. The analyzing unit 1100 may therefore identify conditions under the different situations. Such algorithms and conditions are not limited by embodiments of the present disclosure.

The associating module 1115 may be configured to associate results of the identification of the two or more conditions to determine an activity category. For example, the associating module 1115 may define four scenarios based on the results of identification of conditions by the analysis module 1110. The four scenarios or activity categories may include, but are not limited to:

A non-suspicious activity category, where the analysis module 1110 has not identified any suspicious person nor recognized any suspicious behavior;

A possible suspicious activity category, where the analysis module 1110 has identified a suspicious person, but has not recognized any suspicious behavior;

An on-going suspicious activity category, where the analysis module 1110 has identified a suspicious person and recognized an on-going suspicious behavior (e.g., performed by the suspicious person); and A post-activity category, where the analysis module 1110 has identified that a suspicious activity has been conducted and the suspicious person is escaping.

In some embodiment, the associating module 1115 may determine other scenarios or activity categories. For example, the associating module 1115 may determine the on-going suspicious activity category where no suspicious person has been identified, but an on-going suspicious activity performed by a non-suspicious person has been detected. In another example, the associating module 1115 may determine a suspicious object category where the analysis module 1110 has identified a vehicle without a plate or with a stolen plate. The output module 1120 may be configured to output the determined scenario or activity category to the coordinating unit 1300 of the surveillance system 1000.

The coordinating unit 1300 may be configured to assign tasks to robotic surveillance devices 1200 according to the activity categories determined by the analysis module 1200. The tasks may contain one or more responding actions to be performed by the robotic surveillance devices 1200. The coordinating unit 1300 may be a separate unit of the surveillance system 1000. For example, the coordinating unit 1300 may be, or may reside on a computing device such as a smart phone, a person computer, a laptop, a tablet, a smart wearable device, etc. Alternatively, the coordinating unit 1300 may be embedded in one or more of the robotic surveillance devices 1200.

In some embodiments, for each activity category, the coordinating unit 1300 may assign corresponding tasks to the robotic surveillance devices 1200 based on their locations. In some embodiments, the coordinating unit 1300 may determine an area (also referred to as a "zone") where one of the conditions occurs. For example, the coordinating unit 1300 may determine an area or a zone that is within a predetermined distance (e.g., 5 meters, 10 meters, 50 meters, 100 meters, etc.) to the identified suspicious person, suspicious activity, or suspicious non-human object (such as a car with a stolen plate). The coordinating unit 1300 may determine relative locations of the robotic surveillance devices 1200 to the zone of the condition. For example, the coordinating unit 1300 may determine whether a robotic surveillance device 1200 is within the zone of condition, outside and adjacent to the zone of condition, or outside and non-adjacent to the zone of condition. The coordinating unit 1300 may classify the robotic surveillance devices 1200 into different groups based on their relative locations to the zone of condition. For example, the coordination unit 1300 may classify the robotic surveillance devices 1200 inside the zone to one group, the robotic surveillance devices 1200 adjacent to the zone into another group, and the robotic surveillance devices 1200 outside and non-adjacent to the zone into yet another group. The coordinating unit 1300 may assign different tasks to the robotic surveillance devices 1200 based on their groups and also based on different activity categories.

Under the non-suspicious activity category, because no suspicious person or suspicious behavior has been identified, the coordinating unit 1300 may assign to the robotic surveillance devices 1200 the tasks of patrolling or monitoring within a predetermined region. In some embodiments, assume that there are n robotic surveillance devices 1200 and the possible walking space of the robots 1200 is already predetermined. For example, it is predesigned that the robotic surveillance devices 1200 are travelling within a predetermined area such as a floor of a building. The walking space may then by divided into n zones based on the structure or layout of the walking space or according to user's preference. The coordinating unit 1300 may instruct each robotic surveillance device 1200 to occupy one of the n zones for patrolling or monitoring.

In some embodiments, the coordinating unit 1300 may instruct one or more of the robotic surveillance devices 1200 to remain stationary at a predetermined location and monitor its surroundings. The predetermined locations may be include, but are not limited to, key locations predetermined by the user, such as entrances (e.g., doors, windows), forks in the road, hot spots (e.g., busy regions), etc. The coordinating unit 1300 may instruct the other robotic surveillance devices 1200 to patrol back and forth within the their current zones.

In the possible suspicious activity category, since a suspicious person has been identified, but no suspicious behavior has been recognized, the coordinating unit 1300 may assign different tasks to the robotic surveillance devices 1200 based on their actual locations. In some embodiments, the coordinating unit 1300 may instruct one or more robotic surveillance devices 1200 in the zone of a suspicious person to approach the suspicious person and track the person. For example, the surveillance system 1000 may be installed in a floor of a building, and the zones are divided based on locations of actual rooms in the floor. The room where the suspicious person presents may be referred to as Zone X. According to one coordinating strategy, the coordinating unit 1300 may classify the robotic surveillance devices into three groups based on their locations: within Zone X (i.e., in the room where the suspicious person presents), adjacent to Zone X (i.e., in rooms adjacent to the room where the suspicious person presents), or non-adjacent to Zone X (i.e., in rooms away from the room where the suspicious person presents). The coordinating unit 1300 may assign the robotic surveillance devices in the same group with the same one or more tasks. For example, the tasks for the robotic surveillance devices 1200 in different groups are listed in the following Table 1.

TABLE 1 tasks for robotic surveillance devices 1200 in different groups under a possible suspicious activity category

| Group of the robotic surveillance devices | Tasks for the robotic surveillance devices |
| --- | --- |
| Inside Zone X | Approaching and tracking the suspicious person |
| Adjacent to Zone X | Approaching Zone X and monitoring situations in the adjacent zone |
| Non-adjacent to Zone X | Patrolling |

As shown in Table 1, if a robotic surveillance device 1200 is within Zone X, the coordinating unit 1300 may instruct it to approach and track the suspicious person using the tacking algorithm described below. If the coordinating unit 1300 detects a robotic surveillance device 1200 adjacent to Zone X, it may instruct the robotic surveillance device 1200 to approach Zone X and monitor possible situations in the adjacent zone. For a robotic surveillance device 1200 that is not adjacent to Zone X, the coordinating unit 1300 may assign it with the task of continuing patrolling in its current zone.

Under an on-going suspicious activity category, a suspicious person has been identified and an on-going suspicious behavior has been recognized. Accordingly, the coordinating unit 1300 may assign the robotic surveillance devices 1200 with different tasks based on their actual locations. Again assuming that the zone where the suspicious person presents is Zone X, and the coordinating unit 1300 classifies the robotic surveillance devices 1200 into three groups based on their locations (within Zone X, adjacent to Zone X and non-adjacent to Zone X). The coordinating unit 1300 may assign the following tasks to the robotic surveillance devices 1200 in different zones as listed in Table 2.

As shown in Table 2, if a robotic surveillance device 1200 is classified into a group within Zone X, the coordinating unit 1300 may instruct it to approach the suspicious person using the path planning algorithm described below, and to inform a security officer and the crowds via an audio player equipped thereon. If the robotic surveillance device 1200 is classified as adjacent to Zone X, the coordinating unit 1300 may assign the robotic surveillance device 1200 with one or more of the tasks selected from entering Zone X, looking for a security officer nearby, and predicting the person's escaping direction and tracking in the escaping direction. With respect to a robotic surveillance device 1200 that is not adjacent to Zone X, the coordinating unit 1300 may instruct it to continue patrolling.

TABLE 2 tasks for robotic surveillance devices 1200 in different groups under an on-going suspicious activity category

| Group of the robotic surveillance devices | Tasks of the robotic surveillance device |
| --- | --- |
| Inside Zone X | Approaching the suspicious person, and informing a security officer and the crowds |
| Adjacent to Zone X | Entering Zone X, looking for a security officer, or predicting and tracking in the person's escaping direction |
| Non-adjacent to Zone X | Patrolling |

Under a post activity category, it has identified that a suspicious activity has been conducted and the suspicious person is now escaping. Accordingly, the coordinating unit 1300 may assign the robotic surveillance devices 1200 with different tasks based on their actual locations. The zone where the suspicious person presents is again referred to as Zone X, and the coordinating unit 1300 classifies the robotic surveillance devices 1200 into three groups based on their locations (within Zone X, adjacent to Zone X or not adjacent to Zone X). In some embodiments, the coordinating unit 1300 may instruct the robotic surveillance device 1200 within the Zone X to perform video recording and to track the suspicious person using the tracking algorithm described below. If the suspicious person is determine to be dangerous (either by the robotic surveillance device 1200 within the Zone X, or through the analysis by the analyzing unit 1100), the coordinating unit 1300 may instruct the robotic surveillance device 1200 within the Zone X to play sharp alarm whistle to alert nearby crowds using an audio player equipped on it.

Under the same category, in some embodiment, the coordinating unit 1300 may assign the robotic surveillance device 1200 adjacent to the Zone X with a task of remaining stationary and continuing monitoring. Alternatively, the coordinating unit 1300 may also instruct the robotic surveillance devices 1200 to go to the predetermined key locations via which the suspicious person is most likely to escape, such as entrances (e.g., doors, windows, etc.) or forks of the road. In some embodiments, the coordinating unit 1300 may instruct the robotic surveillance devices 1200 adjacent to the Zone X to also predict a possible future location of the suspicious person using the location prediction method described below, and then wait near the predicted location and perform a video or picture recording.

In some embodiments, under the post-activity category, the coordinating unit 1300 may instruct the robotic surveillance devices 1200 not adjacent to Zone X to go to the Zone X with a nearby security officer along an optimal path. For example, one or more of the robotic surveillance devices 1200 may include a manned platform, so that a security officer may ride on the robotic surveillance devices 1200 and be in charge of responding operations. The optimal path may be calculated via the below-mentioned path planning methods. In some embodiments, the coordinating unit 1300 may assign other tasks to the robotic surveillance devices 1200 according to other determined categories, and these are not limited by the embodiments of the present disclosure.

Figure 3:
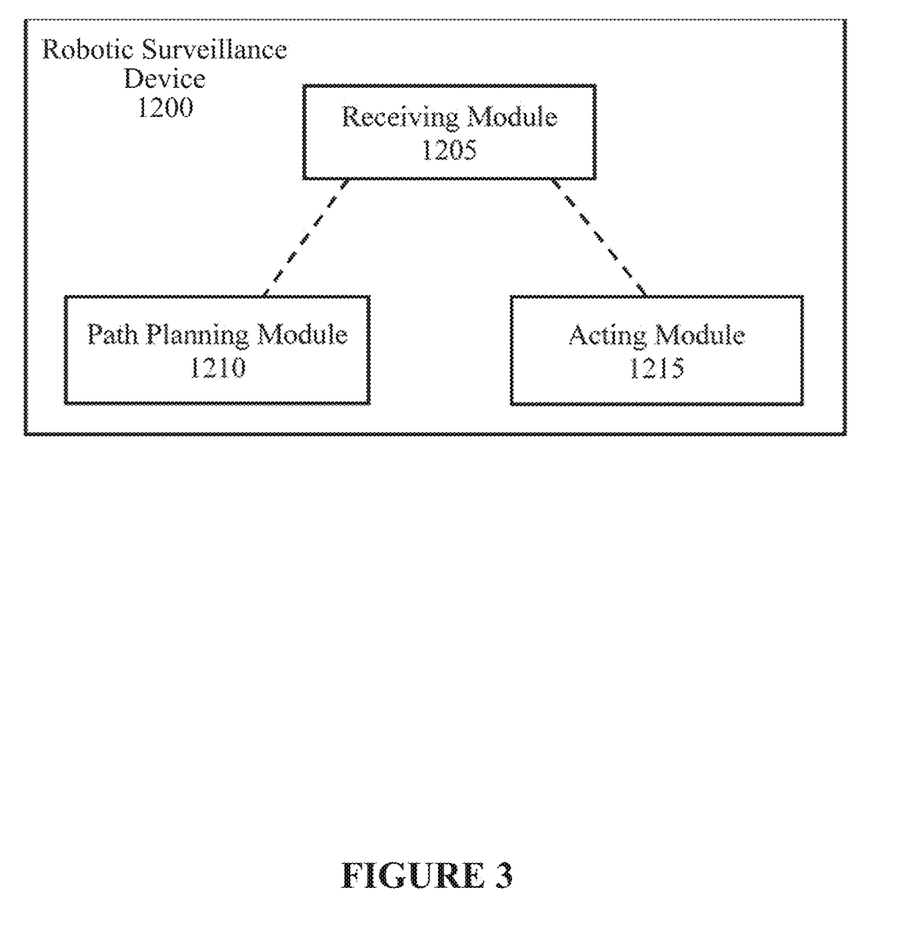
FIG. 3 illustrates software components of an exemplary robotic surveillance device according to some embodiments of the present disclosure.

The robotic surveillance devices 1200 may be configured to receive tasks from the coordinating unit 1300 and perform the tasks under the specific activity categories determined by the analyzing unit 1100. The robotic surveillance device 1200 may comprises hardware components and software components. In some embodiments, the robotic surveillance device 1200 may be a drone, a wheel driven robot, etc. FIG. 3 illustrates software components of an exemplary robotic surveillance device 1200 according to some embodiments of the present disclosure. As shown in FIG. 3, the robotic surveillance device 1200 may include a receiving module 1205, a path planning module 1210 and an acting module 1215. The receiving module 1205 may be configured to receive a task from the coordinating unit 1300. For example, the task is to perform responding actions by the robotic surveillance device 1200.

The path planning module 1210 may be configured to plan a path for the robotic surveillance device 1200 to conduct responding actions described by the task. In some embodiments, the path planning module 1210 may be configured to plan a path from the current location of the robotic surveillance device 1200 to a desired location using various path planning methods. The desired location may be described in the task. For example, under the on-going activity category, the task for a robotic surveillance device 1200 adjacent to Zone X may be to enter Zone X. Accordingly, the desired location for the robotic surveillance device 1200 is the Zone X. In other examples, the task may be approaching a suspicious person, so the desired location for the robotic surveillance device 1200 receiving this task is the location of the suspicious person.

In some embodiments, the path planning module 1210 may select a predetermined path as the traveling path of the robotic surveillance device 1200. For example, a plurality of predetermined paths may be pre-stored in the path planning module 1210 or a database of the surveillance system 1000 (not shown) and the path planning module 1210 may select the most suitable path based on predetermined criteria. For example, the path planning module 1210 may select the shortest predetermined path from the current location to the desired location. Other criteria may also be appropriate, and is not limited by embodiments of the present disclosure.

In other embodiments, the path planning module 1210 may calculate an optimal path from the present location to the desired location for the robotic surveillance device 1200 to travel along. For example, the path planning module 1210 may build nodes based on a known map, and then calculate the optimal path using a path planning algorithm. The nodes of the map may be built using various methods. For example, the nodes may be built based on landmarks. Usually landmarks may be representative locations such as doors, tables, etc. In another example, the nodes may be built by gridding the map. For example, a map may be divided by n horizontal lines and n vertical lines, and each grid formed by the horizontal lines and the vertical lines may be built as a node. The map obtained through gridding may be referred to as an "occupancy grid map."

Further, the path planning module 1210 may calculate the optimal path based on various path planning algorithms. For example, the path planning module 1210 may use the Dijkstra's algorithm. The path planning module 1210 may fix a single node as the "source" node or a starting point and find the shortest paths from the source node to all other nodes in the map. The node may also be referred to as a "point" or an "intersection," conveniently hereinafter. By applying the Dijkstra's algorithm, the path planning module 1210 may assume that one would like to find the shortest path between two intersections on an occupancy grid map, referred to as a starting point and a destination. The path planning module 1210 may initially assign to a starting point a tentative distance value of zero, and to each of the other intersections on the map a tentative distance value, e.g., infinity or a super large value, indicating that those intersections have not yet been visited by the algorithm. At each iteration, the path planning module 1210 may select a current intersection. For the first iteration, the current intersection may be the starting point, and the distance to it may be zero. For the subsequent iterations, the current intersection may be the closest unvisited intersection to the starting point.

In some embodiments, the path planning module 1210 may update the tentative distance value for each unvisited intersection. The path planning module 1210 may calculate a distance from the current intersection to each unvisited intersection that is directly connected to it. The path planning module 1210 may then compare the value of the distance and the previously assigned tentative value for each unvisited intersection. If the value of the distance is less than its previously assigned tentative value, the path planning module 1210 may assign the value of the distance to the unvisited intersection. This way, the intersection may be relabeled with the shorter path if the path to it through the current intersection is shorter than the previously known path. After updating the tentative distance value of each neighboring intersection to the current intersection (e.g., the intersection that is directly connected to the current intersection), the path planning module 1210 may mark the current intersection as visited, and select the unvisited intersection with the lowest distance value as the new current intersection. Nodes marked as visited may be labeled with the shortest path from the starting point to it and may not be revisited or returned to.

In some embodiments, the path planning module 1210 may continue this process of updating the neighboring intersections with the shortest distances, marking the current intersection as visited and moving onto the closest unvisited intersection until the destination is marked as visited and the shortest path from the starting point to the destination may thus be determined.

In other embodiments, the path planning module 1210 may use the Bellman-Ford algorithm. Similar to the Dijkstra's Algorithm, the Bellman-Ford algorithm is based on the principle of relaxation, where an approximation to the correct distance may be gradually replaced by more accurate values until the optimum solution is reached eventually. In both algorithms, the approximate distance to each vertex or node may always be an overestimate of the true distance, and may be replaced by the minimum of its old value and the length of a newly found path. The Bellman-Ford algorithm simply relaxes all the edges, and does this |V|−1 times, where |V| is the number of vertices or nodes in a graph such as a map. In each of these repetitions, the number of vertices with correctly calculated distances grows, eventually all vertices may have their correct distances.

In some embodiments, by applying the Bellman-Ford algorithm, the path planning module 1210 may set a graph, e.g., a map, G(V,E), where V is the vertex set of G, and E is the edge set of G, an original point s, an array "Distance [n]," where n is the number of the vertices. The path planning module 1210 may initialize the array Distance[n] as ∞ and Distant [s] as 0. The path planning module 1210 may then record the length of the path from the original point s to a vertex i. Following operations may be executed for at most n−1 times. For each edge e(u,v), if Distant [u]+w(u,v)<Distant [v], then Distant [v]=Distant [u]+w(u, v), where w(u,v) is the weight of edge e(u,v). When such an operation does not update the numerical value of Distant [v], the loop may be ended because it may indicate that the shortest path has been found or some of the points are unreachable. Otherwise, the next cycle may be executed. Other path planning algorithms and methods may also be used, and are not limited by embodiments of the present disclosure.

The acting module 1215 may be configured to allow the robotic surveillance device 1200 to conduct one or more responding actions in response to the received task. Under different scenarios determined by the analyzing unit 1100, the acting module 1215 of the robotic surveillance device 1200 may control the robotic surveillance device 1200 to perform different actions. For example, if the task is to perform video or picture recording, the acting module 1215 may control the robotic surveillance device 1200 to conduct active video recording.

Figure 4:
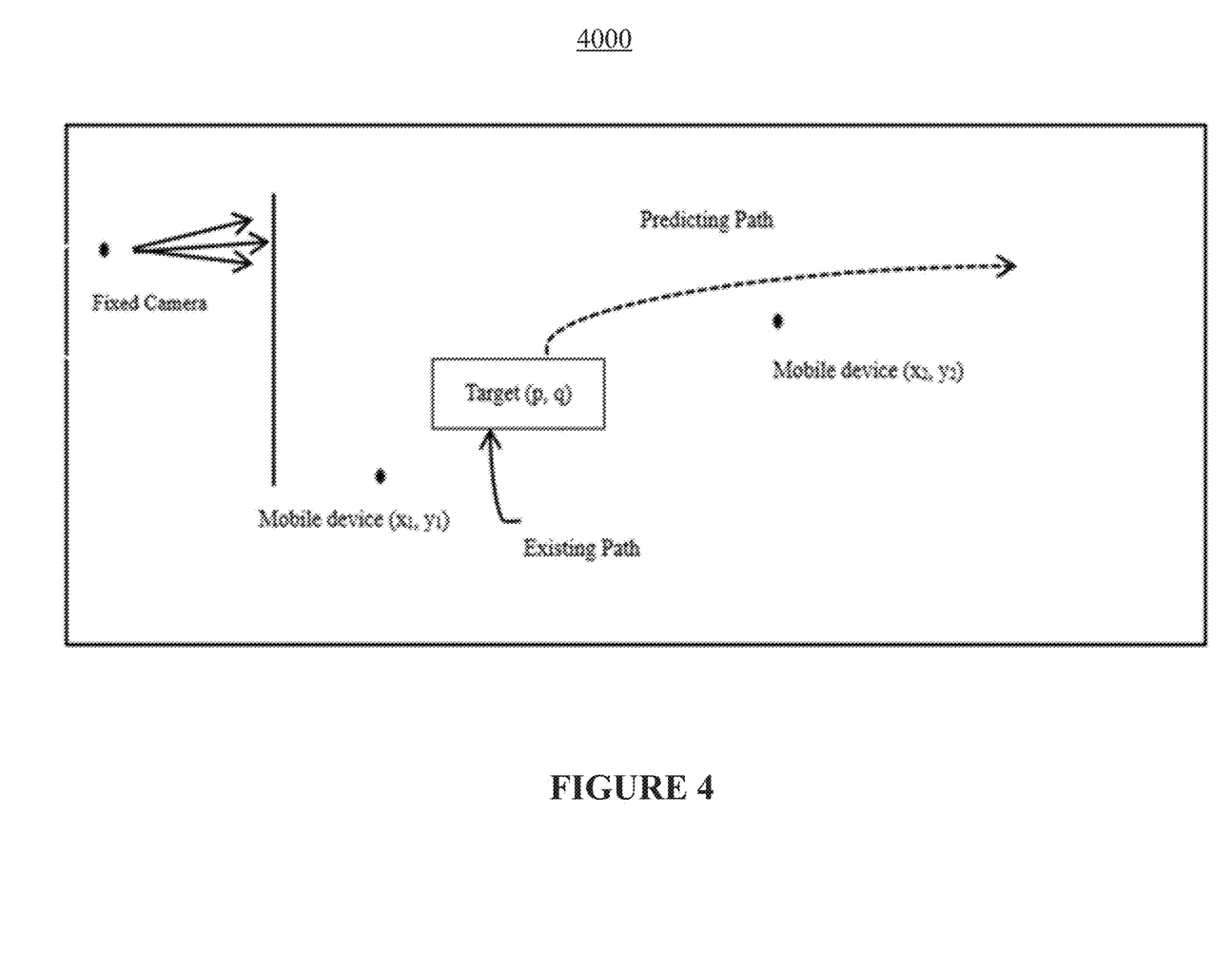
FIG. 4 illustrates a schematic diagram showing different recording strategies used by the robotic surveillance device according to some embodiments of the present disclosure.

Referring now to FIG. 4, a schematic diagram 4000 showing different recording strategies used by the robotic surveillance device 1200 is illustrated according to some embodiments of the present disclosure. As shown in FIG. 4, robotic surveillance devices 1200, e.g., drones or mobile robots equipped with cameras, may go to various desired locations to perform video or picture recording according to different recording strategies. In some embodiments, one video or picture recording strategy may be peripheral recording where the robotic surveillance device 1200 may select a peripheral location and change its recording angle from the selected location towards a target indicated by the task (e.g., a suspicious person). For example, in FIG. 4, the location of the person is (p,q) and the selected location is (x1,y1), and the recording angle may be represented by the vector from (x1,y1) to (p,q).

In some embodiments, the video or picture recording strategy may be recording at a predicted location. According to this strategy, the robotic surveillance device 1200 may predict a possible future location of the target, move to a location near the predicted location of the target, and perform the video or picture recording. For example, in FIG. 4, the current location of the target is (p,q), and the robotic surveillance device 1200 may predict that the target is likely to move to the location (x2,y2) within a short period of time. Therefore, the robotic surveillance device 1200 may travel to a location (not shown in FIG. 4) that is near the predicted location of the target and perform the recording within or after the time period.

Figure 5:
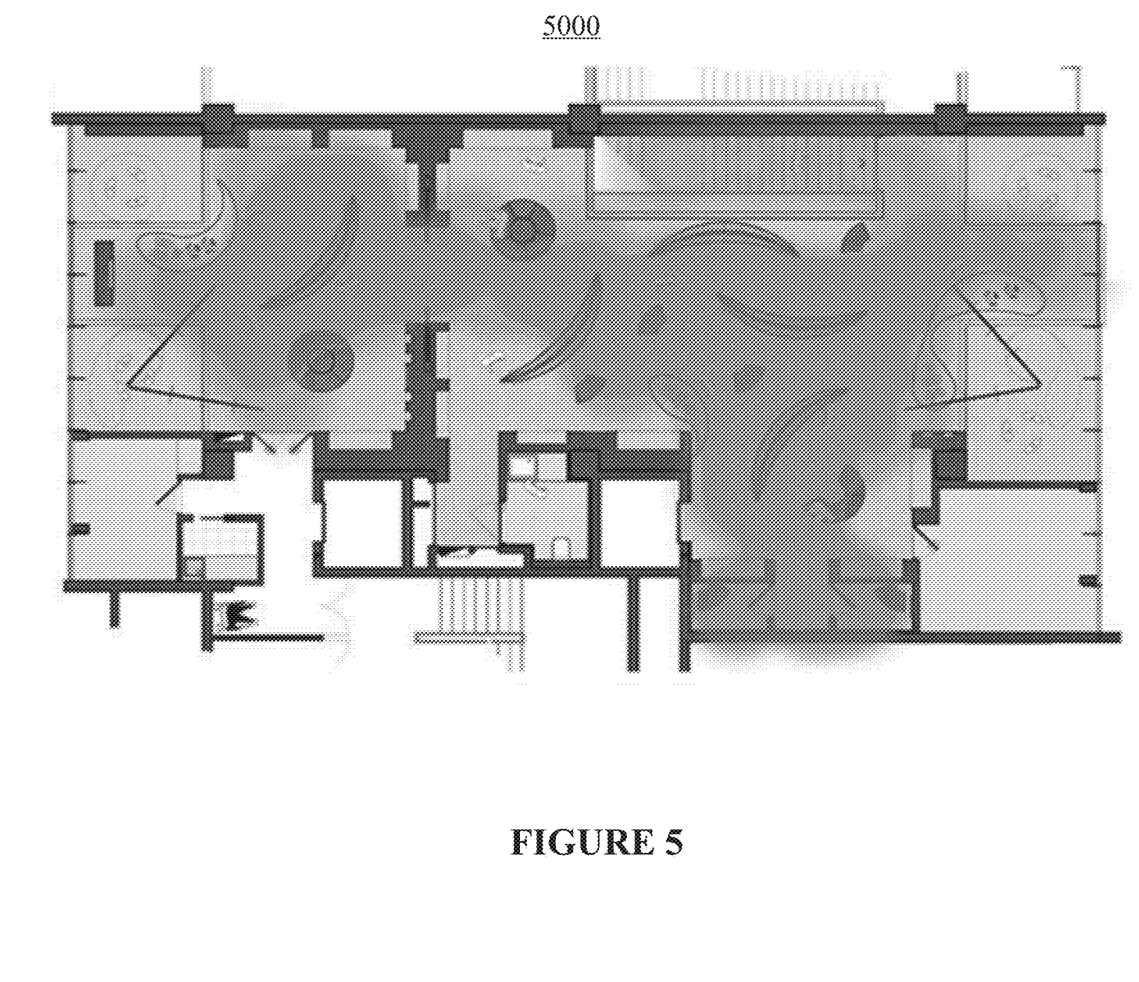
FIG. 5 illustrates an exemplary heat map used for location prediction according to some embodiments of the present disclosure.

The future location of a target may be predicted according to different algorithms. In some embodiments, the predicted location may be calculated based on probability, where the robotic surveillance device 1200 may predict the regions where the target is most likely to show up by using a heat map. Specifically, some nodes in the map are more likely to be accessed than the others. Examples of such nodes include, but are not limited to, nodes near the door, the corridor connecting to halls, and the exit closest to the target. The robotic surveillance device 1200 may generate a heat map by defining the likelihoods of the nodes to be accessed. FIG. 5 illustrates an exemplary heat map 5000 used in location prediction according to some embodiments of the present disclosure. In FIG. 5, the likelihood or probability of being accessed for each node in the map may be represented by a degree of grey. A higher degree of grey may represent a higher likelihood.

In other embodiments, the predicted location may be calculated based on a previous trajectory of the target. Applying this algorithm, if the previous trajectory curve of the target is known, the robotic surveillance device 1200 may predict a tendency of the curve by conducting a curve-fitting. The algorithm may further adopt the Kalman Filter, so that the result may be more accurate. This fine level prediction is more accurate since it estimates the actual tendency of a behavior, reducing prediction errors. In yet other embodiments, the above mentioned location predicting algorithms may be applied in combination. In addition, other algorithms may also be used, and are not limited by embodiments of the present disclosure.

In some embodiments, the robotic surveillance device 1200 may track the target indicated by the trigger event and perform continuous recording. In order to track the target, the robotic surveillance device 1200 may adopt a Multi-Scale Domain Adaptation Tracker (MSDAT) algorithm, described by "ROBUST AND REAL-TIME DEEP TRACKING VIA MULTI-SCALE DOMAIN ADAPTATION," 2017 IEEE International Conference on Multimedia and Expo (ICME), Hong Kong, 2017, pp. 1338-1343, and therefore incorporated by reference in its entirety. For example, the robotic surveillance device 1200 may apply the MSDAT algorithm to transfer features for image classification to a visual tracking domain via convolutional channel reductions.

Figure 6:
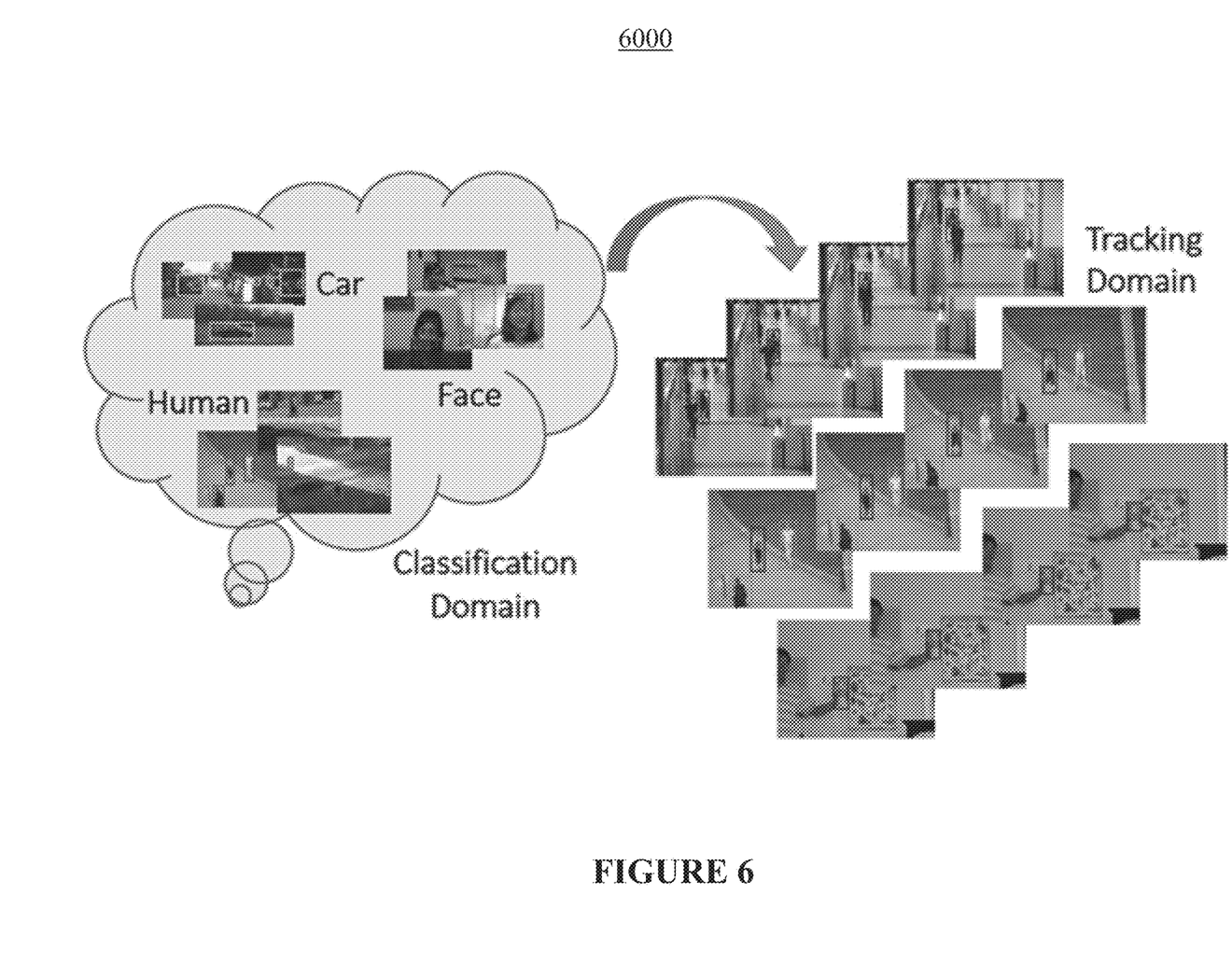
FIG. 6 illustrates a diagram showing an adaptation procedure of the Multi-Scale Domain Adaptation Tracker (MS-DAT) algorithm according to some embodiments of the present disclosure.

FIG. 6 illustrates a diagram showing an adaptation procedure 6000 of the Multi-Scale Domain Adaptation Tracker (MSDAT) algorithm according to some embodiments of the present disclosure. In FIG. 6, most of a deep neural network may be pre-trained for image classification, where the algorithm focus on object classes. The robotic surveillance device 1200 may apply the MSDAT algorithm to transfer the classification features to the visual tracking domain, where an individual object may be treated independently. Other tracking and/or recording strategies may also be used by the robotic surveillance device 1200, and are not limited by embodiments of the present disclosure.

In some embodiments, the robotic surveillance device 1200 may interact with a security officer when the coordinating unit 1300 has determined that the scenario needs a security officer to intervene. The robotic surveillance device 1200 may carry the security officer to the desired location. When necessary, the security officer may take control of the robotic surveillance device 1200 to ride it to the desired location. The robotic surveillance device 1200 may include a manned platform (not shown in FIG. 3) for carrying a person during operation. Examples of the manned platform may include, but are not limited to, a bicycle, a motorcycle, a quadricycle, and any other suitable forms as long as it can provide the function of carrying a person. The battery and the payload of the manned platform are not limited to specific types, but may be selected by a person skilled in the art according to actual needs. However, it should be noted that the battery and the payload should at least be sufficient for carrying a human being with normal weight and normal height.

In some embodiments, the robotic surveillance device 1200 may also include other interaction devices for facilitating surveillance. For example, the robotic surveillance device 1200 may include an audio player, which may play instructions or sounds to inform the user such as a security officer and/or nearby crowds. The sound may be an alarm whistle from gentle to sharp depending on the urgent level of the scenario determined by the analyzing unit 1100. The robotic surveillance device 1200 may also include a vibration sensor, which may start vibrating under predetermined circumstances so as to alert the user such as a security officer of a coming or on-going situation. The robotic surveillance device 1200 may further include a display device, which may display pictures or videos showing road conditions, suspicious locations, or even possible escape or travelling paths of suspicious persons. Other type of interaction devices may also be equipped on the robotic surveillance device 1200, and are not limited by the embodiments of the present disclosure.

In some embodiments, the robotic surveillance device 1200 may further include a programmable operating system for managing computer hardware and software resources and for providing services for computer programs. Examples of the operating system may include, but are not limited to, Android operating system and Robot Operating System (ROS). ROS is a flexible framework for writing robot software. In some embodiments, the robotic surveillance device 1200 may also include hardware operating means for operating the hardware of the device directly. For example, if the robotic surveillance device 1200 is equipped with an Android system, Application Program Interfaces (APIs) or Software Development Kits (SDKs) may be provided for directly controlling related sensors or mobile components of the robotic surveillance device 1200. In some embodiments, the robotic surveillance device 1200 may also include various types of sensors for facilitating its actions such as path planning. The sensors may include general purpose sensors such as laser sensors, Light Detection and Ranging (LIDAR) sensors, cameras, sonar sensors, etc. The sensors may also include special purposed sensors designed for specific uses, such as sensors used in Simultaneous Localization and Mapping (SLAM) technologies.

Figure 7:
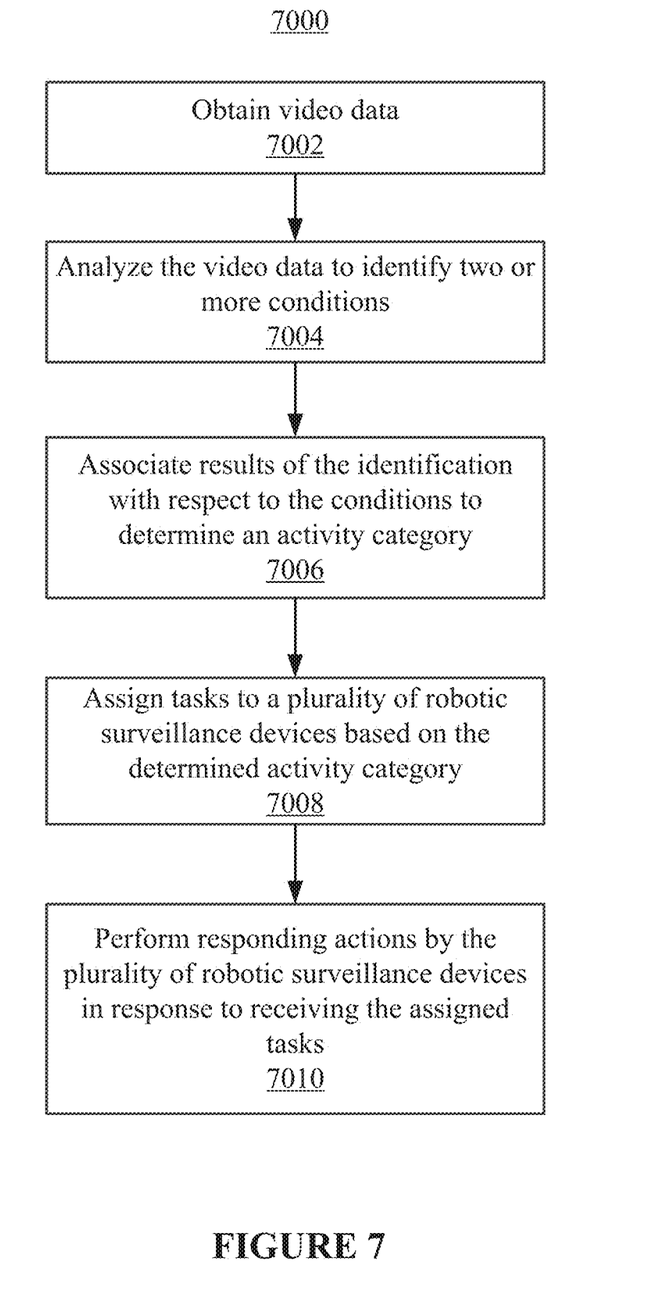
FIG. 7 illustrates a flow chart of an exemplary working process of the robot assisted surveillance system in FIG. 1 according to some embodiments of the present disclosure.

FIG. 7 illustrates a flow chart of an exemplary working process 7000 of the robot assisted surveillance system in FIG. 1 according to some embodiments of the present disclosure. At block 7002, the analyzing unit 1100 of the surveillance system 1000 may obtain video data. For example, video stream captured by the cameras may be imported into the analyzing unit 1100. At block 7004, the analyzing unit 1100 may analyze the video data to identify two or more conditions. For example, the analyzing unit 1100 may analyze video clips using suitable identity recognition algorithm and activity recognition algorithm to detect if there is a suspicious person, if the person is performing any suspicious activity, etc.

At block 7006, the analyzing unit 1100 may associate results of the identification with respect to the conditions to determine an activity category. For example, the analyzing unit 1100 may determine a non-suspicious activity category where neither a suspicious person nor a suspicious activity has been identified. The analyzing unit 1100 may determine a possible suspicious activity category where a suspicious person has been identified while no suspicious activity has been recognized. Further, the analyzing unit 1100 may determine an on-going suspicious activity category where a suspicious person and an on-going suspicious activity have been identified. The on-going suspicious activity may be performed by the suspicious person. Furthermore, the analyzing unit 1100 may determine a post-activity category where it is identified that a suspicious activity has been conducted and a suspicious person is escaping.

At block 7008, the analyzing unit 1100 may assign tasks to a plurality of robotic surveillance devices 1200 based on the determined activity category. For example, under different activity categories the tasks may be different for the robotic surveillance devices 1200. At block 7010, the plurality of robotic surveillance devices 1200 may perform responding actions in response to receiving the assigned tasks.

Figure 8:
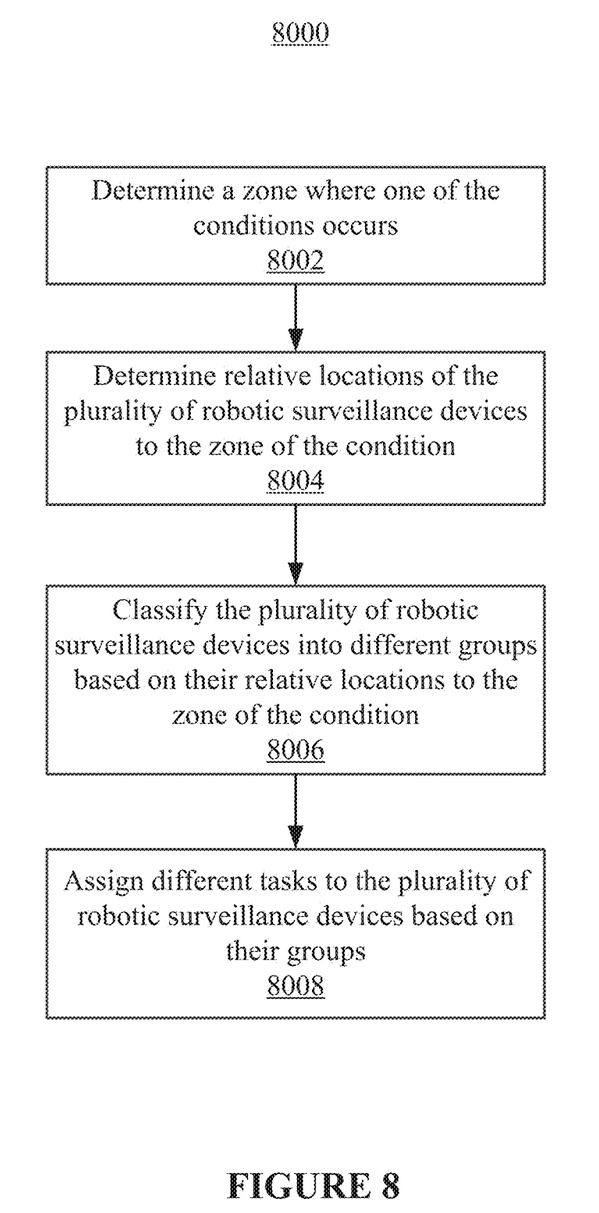
FIG. 8 illustrates a flow chart of an exemplary working process of assigning tasks among robotic surveillance devices according to some embodiments of the present disclosure.

FIG. 8 illustrates a flow chart of an exemplary working process 8000 of assigning tasks among robotic surveillance devices 1200 according to some embodiments of the present disclosure. At block 8002, the coordinating unit 1300 of the surveillance system 1000 may determine a zone where one of the conditions occurs. For example, the coordinating unit 1300 may determine an area that is within a predetermined distance to the identified suspicious person, activity, or non-human object (such as a stolen car). At block 8004, the coordinating unit 1300 may determine relative locations of the plurality of robotic surveillance devices 1200 to the zone of the condition. For example, the coordinating unit 1300 may determine whether a robotic surveillance device 1200 is within the zone of condition, outside and adjacent to the zone of condition, or outside and non-adjacent to the zone of condition.

At block 8006, the coordinating unit 1300 may classify the plurality of robotic surveillance devices 1200 into different groups based on their relative locations to the zone of condition. For example, the coordination unit 1300 may classify the robotic surveillance devices 1200 into groups of inside the zone, adjacent to the zone, and outside and non-adjacent to the zone. At block 8008, the coordinating unit 1300 may assign different tasks to the robotic surveillance devices 1200 based on their groups. For example, under the possible suspicious activity category, the coordinating unit 1300 may assign the robotic surveillance devices 1200 inside the zone with a task of approaching and tracking a suspicious person.

Although the above-mentioned surveillance system is usually used for human detection and surveillance, the present discloser is not limited thereto, but can be applied to detect general non-human objects, such as automobiles or animals. Further, those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality. In applications according to present application, one element may perform functions of several technical features recited in claims. Any reference signs in the claims should not be construed as limiting the scope.

What is claimed is:

1. A surveillance system, comprising one or more computing devices and a plurality of robotic surveillance devices disposed in an area, wherein:

the one or more computing devices are configured to:

obtain video data from one or more of the plurality of robotic surveillance devices;
analyze the video data to identify at least one condition based on features for image classification in the video data;
determine an activity category of the at least one condition, wherein the activity category includes an on-going suspicious event of a suspicious person performing a suspicious activity;
determine a first zone of condition where the suspicious event occurs, wherein the first zone of condition is a zone within a predetermined distance to the suspicious person;
classify the plurality of robotic surveillance devices into three groups: a first group inside the first zone of condition, a second group outside and adjacent to the first zone of condition, and a third group outside and non-adjacent to the first zone of condition; and
assign first, second, and third tasks respectively to the first, the second, and the third groups of robotic surveillance devices, and
each of the robotic surveillance devices in the first group is configured to, in response to being assigned the first tasks:
approach the suspicious person; and
track the suspicious person by transferring the features for image classification to a visual tracking domain via convolutional channel reductions,
at least one or more of the robotic surveillance devices in the second group are configured to, in response to being assigned the second tasks:
build a plurality of nodes based on landmarks on a map of the area;
plan a path based on the plurality of nodes;
determine likelihoods of the nodes to be accessed by the suspicious person in future;
generate a heat map based on the likelihoods of the nodes to be accessed by the suspicious person in future;
determine a previous trajectory of the suspicious person;
predict a future location of the suspicious person based on the heat map and the previous trajectory;
move to a location near the predicted future location based on the planned path; and
perform video recording near the predicted future location,
at least one or more of the robotic surveillance devices in the second group are configured to, in response to being assigned the second tasks:
enter the first zone of condition from a place outside and adjacent to the first zone of condition, and
each of the robotic surveillance devices in the third group is configured to, in response to being assigned the third tasks, patrol in a current zone.

2. The surveillance system according to claim 1, wherein the at least one condition includes detecting two or more of the following: a person identity, an activity, a combination of a person identity and an activity, or a non-human object.

3. The surveillance system according to claim 1, wherein the activity category further includes a possible suspicious event, a non-suspicious event, and a post-activity event, wherein the possible suspicious event corresponds to a suspicious person being detected without any suspicious activity being detected.

4. The surveillance system according to claim 3, wherein the non-suspicious event is determined when no suspicious person and no suspicious activity is identified.

5. The surveillance system according to claim 3, wherein the post-activity event is determined when it is identified that a suspicious activity has been conducted and a suspicious person is escaping.

6. The surveillance system according to claim 3, wherein the one or more computing devices are further configured to:
determine a second zone condition where the possible suspicious event occurs, and wherein each robotic surveillance device in the second zone of condition is configured to:
approach the suspicious person; and
track the suspicious person by transferring the features for image classification to a visual tracking domain via convolutional channel reductions.

7. The surveillance system according to claim 5, wherein the one or more computing devices are further configured to:
determine a third zone condition where the post-activity event occurs, and wherein each robotic surveillance device in the third zone of condition is configured to:
performing video recording and tracking the suspicious person.

8. The surveillance system according to claim 6, wherein the one or more computing devices are further configured to:
determine a second adjacent zone adjacent to the second zone of condition, and where each robotic surveillance device in the second adjacent zone is configured to:
approach the second zone of condition and monitor the second adjacent zone.

9. The surveillance system according to claim 6, wherein the one or more computing devices are further configured to:
determine a second non-adjacent zone that is outside and not adjacent to the second zone of condition, and wherein each robotic surveillance device in the second non-adjacent zone is configured to:
patrol in the second non-adjacent zone.

10. A surveillance method, comprising:
obtaining video data from one or more of a plurality of robotic surveillance devices disposed in an area;
analyzing the video data to identify at least one condition based on features for image classification in the video data;
determining an activity category of the at least one condition, wherein the activity category includes an on-going suspicious event of a suspicious person performing a suspicious activity;
determining a first zone of condition where the suspicious event occurs, wherein the first zone of condition is a zone within a predetermined distance to the suspicious person;
classifying the plurality of robotic surveillance devices into three groups: a first group inside the first zone of condition, a second group outside and adjacent to the first zone of condition, and a third group outside and non-adjacent to the first zone of condition; and
assigning first, second, and third tasks respectively to the first, the second, and the third groups of robotic surveillance devices, and
wherein each of the robotic surveillance devices in the first group is configured to, in response to being assigned the first tasks:
approach the suspicious person; and
track the suspicious person by transferring the features for image classification to a visual tracking domain via convolutional channel reductions, at least one or more of the robotic surveillance devices in the second group are configured to, in response being assigned the second tasks:
build a plurality of nodes based on landmarks on a map of the area;
plan a path based on the plurality of nodes;
determine likelihoods of the nodes to be accessed by the suspicious person in future;
generate a heat map based on the likelihoods of the nodes to be accessed by the suspicious person in future;
determine a previous trajectory of the suspicious person;
predict a future location of the suspicious person based on the heat map and the previous trajectory;
move to a location near the predicted future location based on the planned path; and
perform video recording near the predicted future location,
at least one or more of the robotic surveillance devices in the second group are configured to, in response to being assigned the second tasks:
enter the first zone of condition from a place outside and adjacent to the first zone of condition, and
each of the robotic surveillance devices in the third group is configured to, in response to being assigned the third tasks, patrol in a current zone.

11. The surveillance method according to claim 10, wherein the at least one condition includes detecting two or more of the following: a person identity, an activity, a combination of a person identity and an activity, or a non-human object.

12. The surveillance method according to claim 10, wherein the activity category further includes a non-suspicious event and a post-activity event.

13. A robotic device for surveillance, the robotic device comprising:
one or more processors; and
a memory storing instructions that, when executed by the one or more processors, cause the robotic device to perform:
obtaining video data from one or more of a plurality of robotic surveillance devices disposed in an area;
analyzing the video data to identify at least one condition based on features for image classification in the video data;
determining an activity category based on the at least one condition, wherein the activity category includes an on-going suspicious event of a suspicious person performing a suspicious activity;
determining a first zone of condition where the suspicious event occurs, wherein the first zone of condition is a zone within a predetermined distance to the suspicious person;
classifying the plurality of robotic surveillance devices into three groups: a first group inside the first zone of condition, a second group outside and adjacent to the first zone of condition, and a third group outside and non-adjacent to the first zone of condition; and
assigning first, second, and third tasks respectively to the first, the second, and the third groups of robotic surveillance devices, and
wherein each of the robotic surveillance devices in the first group is configured to, in response to being assigned the first tasks:
approach the suspicious person; and
track the suspicious person by transferring the features for image classification to a visual tracking domain via convolutional channel reductions,
at least one or more of the robotic surveillance devices in the second group are configured to, in response being assigned the second tasks:
build a plurality of nodes based on landmarks on a map of the area;
plan a path based on the plurality of nodes;
determine likelihoods of the nodes to be accessed by the suspicious person in future;
generate a heat map based on the likelihoods of the nodes to be accessed by the suspicious person in future;
determine a previous trajectory of the suspicious person;
predict a future location of the suspicious person based on the heat map and the previous trajectory;
move to a location near the predicted future location based on the planned path; and
perform video recording near the predicted future location,
at least one or more of the robotic surveillance devices in the second group are configured to, in response to being assigned the second tasks:
enter the first zone of condition from a place outside and adjacent to the first zone of condition, and
each of the robotic surveillance devices in the third group is configured to, in response to being assigned the third tasks, patrol in z current zone.

14. The robotic device according to claim 13, wherein the at least one condition includes detecting two or more of the following: a person identity, an activity, a combination of a person identity and an activity, or a non-human object.

* * * * *